United States Patent [19]

Rogers, Jr.

[11] 4,274,123
[45] Jun. 16, 1981

[54] ANIMAL REPELLANT APPARATUS

[76] Inventor: Thurmond J. Rogers, Jr., 7245 Fairbanks, N. Houston, Houston, Tex. 77040

[21] Appl. No.: 62,722

[22] Filed: Aug. 1, 1979

[51] Int. Cl.³ .............................................. H05C 1/02
[52] U.S. Cl. ........................................ 361/232; 43/98
[58] Field of Search ...................... 361/232; 43/59, 98, 43/124

[56] References Cited

U.S. PATENT DOCUMENTS

| | | | |
|---|---|---|---|
| 1,165,485 | 12/1915 | Adams | 43/59 |
| 2,187,928 | 1/1940 | Barcroft | 43/59 |
| 3,480,176 | 11/1969 | Boyd | 361/232 X |

FOREIGN PATENT DOCUMENTS 495915  6/1954  Italy ............................................ 43/98

*Primary Examiner*—Harry E. Moose, Jr.
*Attorney, Agent, or Firm*—Neal J. Mosely

[57] ABSTRACT

An animal repellant apparatus, particularly for protecting trash cans, comprises a mat of rubber, plastic, or other elastomeric material equipped with a system of wires and a source of electric current for shocking and repelling animals. The mat has at least one central opening to receive a trash can and a switch actuated by placing a trash can in position. The mat has a plurality of parallel grooves and ridges in the upper surface thereof with drainage holes extending through the bottom of the grooves to assist in draining off rainwater. A system of wires is provided on the surface of said ridges and a source of electric power provided to energize the wires sufficiently to shock an animal without killing it and without danger to humans, adult or child. The electric power source is connected to the wires so that alternate wires are connected to one side or the other side thereof whereby any animal stepping thereon will be shocked and repelled therefrom.

10 Claims, 6 Drawing Figures

ANIMAL REPELLANT APPARATUS

BACKGROUND OF THE INVENTION

1. Field of the Invention

This invention relates to new and useful improvements in animal repellant apparatus and more particularly, apparatus for protecting trash cans and the like from animals.

2. Brief Description of the Prior Art

Silverman, U.S. Pat. No. 2,297,193, discloses a garbage can holder comprising a base and a supporting railing which prevents the garbage can or trash can from being overturned. This may provide some physical protection against animals.

Adams, U.S. Pat. No. 1,165,485, discloses an electrically charged or energized grid arranged to be supported on the ground or on a floor for guarding the entrances to rooms, dwellings, vaults, business houses, and the like for protection against thieves and burglars. The apparatus carries a sufficient electric charge to kill or severely injure a person stepping on it.

Barcroft, U.S. Pat. No. 2,187,928, discloses an arrangement of electric conductors or strips on a floor or a mat arranged to activate a burglar alarm. The strips are electric conductors and may be metal foil or metal paint applied to a floor or to a matting.

Additionally, it is known to provide electrically energized wire fences for enclosing livestock and it is also known to use electrically energized portable prods for manipulating livestock and other animals.

The prior art, however, does not disclose any simple, electrically energized animal repellant apparatus for protecting trash cans and the like which would not kill an animal or injure a human, adult or child, and particularly, does not disclose apparatus of this type which would be free from shorting out by rainwater.

OBJECTS OF THE INVENTION

One of the objects of this invention is to provide a new and improved apparatus for protecting trash cans and the like from animals.

Another object of this invention is to provide a new and improved animal repellant apparatus which is electrically energized and operable to shock and repel animals coming in contact therewith.

Another object of this invention is to provide a new and improved electrically energized animal repellant apparatus including means to protect the same against rainwater and the like which might tend to short out the equipment.

Still another object of this invention is to provide a new and improved electrically energized animal repellant apparatus which is insulated from the ground and is provided with a system of wires and source of electric current for shocking and repelling animals. Still another object of this invention is to provide a new and improved electrically energized animal repellant apparatus for protecting trash cans against animals and which is energized by the trash can being placed in position.

Other objects of this invention will become apparent from time to time throughout the specification and claims as hereinafter related.

SUMMARY OF THE INVENTION

The foregoing objects and other objects are accomplished by an animal repellant apparatus produced in accordance with this invention.

An animal repellant apparatus, particularly for protecting trash cans, comprises a mat of rubber, plastic, or other elastomeric material equipped with a system of wires and a source of electric current for shocking and repelling animals. The mat has at least one central opening to receive a trash can and a switch actuated by placing a trash can in position. The mat has a plurality of parallel grooves and ridges in the upper surface thereof with drainage holes extending through the bottom of the grooves to assist in draining off rainwater. A system of wires is provided on the surface of said ridges and a source of electric power provided to energize the wires sufficiently to shock an animal without killing it and without danger to humans, adult or child. The electric power source is connected to the wires so that alternate wires are connected to one side or the other side thereof whereby an animal stepping thereon will be shocked and repelled therefrom.

DESCRIPTION OF THE PREFERRED EMBODIMENT

Figure 1:
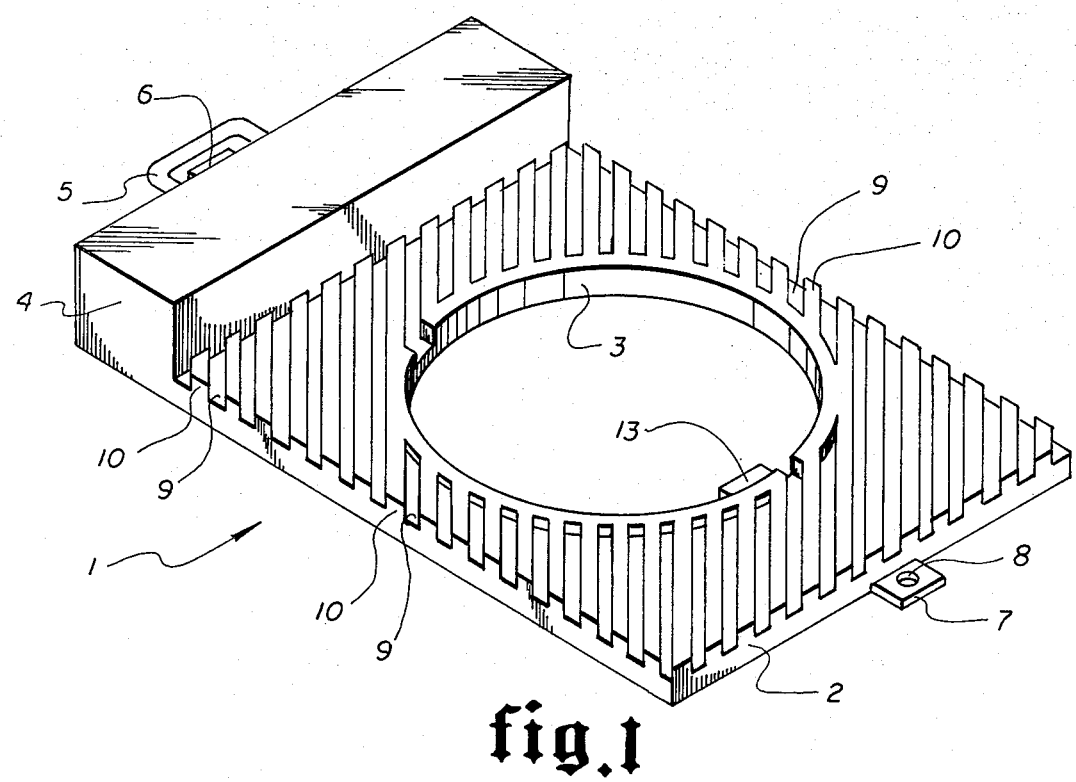
FIG. 1 is an isometric view of a preferred embodiment of an electrically energized mat for protecting trash cans from animals.
Figure 2:
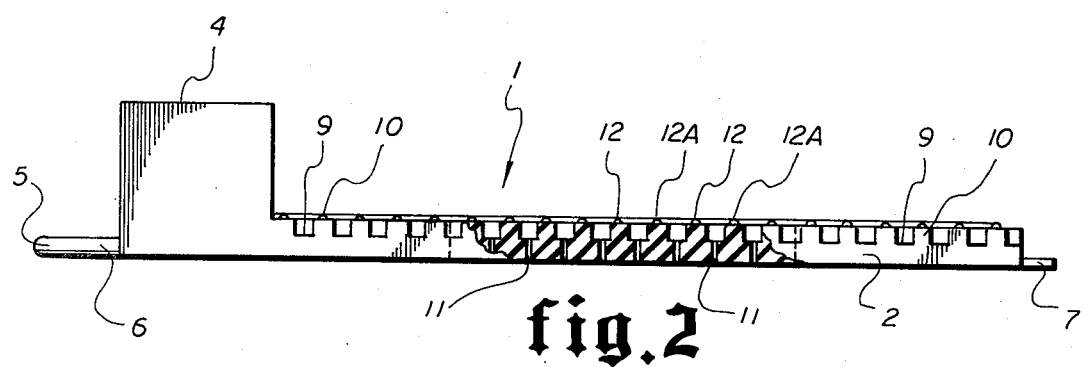
FIG. 2 is a view in side elevation, and partially in broken section, of the animal repellant mat shown in FIG. 1.

Referring to the drawings by numerals of reference, and more particularly, to FIGS. 1 and 2, there is shown an animal repellant apparatus 1 comprising a flat mat 2 which is constructed of an insulating, elastomeric material, such as rubber or flexible plastic. The mat 2 has a central opening 3 adapted to receive a trash can or the like. Mat 3 has an electric power source 4, viz. a conventional portable electric power pack, supported and secured thereon at one end. Mat 2 is provided with a handle 5 for lifting and hanging the equipment when not in use. In addition, mat 2 is provided with tabs 6 and 7 at opposite ends thereof, having apertures 8 for staking the apparatus to the ground to prevent movement.

Figure 3:
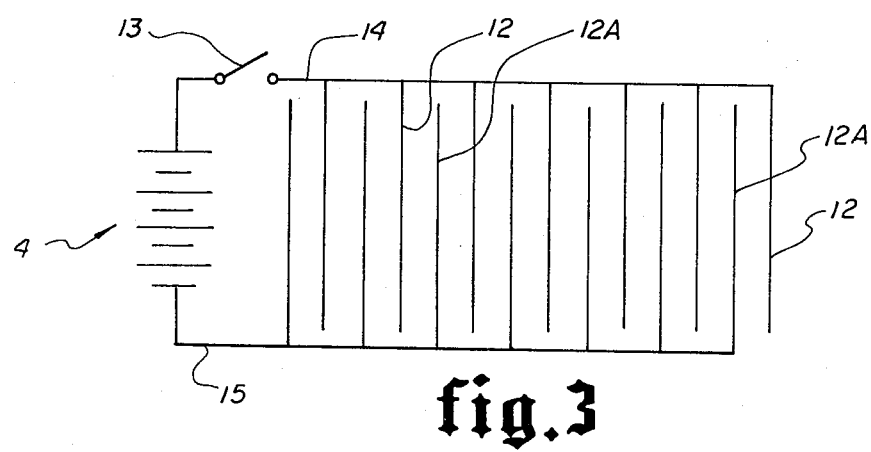
FIG. 3 is a schematic electric wiring diagram illustrating the wiring of the animal repellant mat shown in FIGS. 1 and 2.

Mat 2 has a grooved construction produced by molding or by other forming or shaping operation. Mat 2 is provided with a plurality of spaced grooves 9 and ridges 10 extending in parallel relation along the entire upper surface. The bottom of grooves 9 is pierced by one or more apertures or passages 11 which provide for drainage of water away from the mat. The grooves 9 provide for some water drainage and passages or apertures 11 assist further in draining water away from the surface of the mat. On the upper surface of ridges 10, there are provided a plurality of electric wires 12 which are connected in an electric circuit, as shown in FIG. 3. Electric wires 12 are partially embedded in the upper surface of ridges 10 so that they are secured therein, but have their upper surfaces bare and uninsulated. The mat 2 therefore, is provided with a grid of parallel electric wires, preferably located along the upper surface of each of the ridges 10. The wires 12 are connected to the power source 4 and are controlled by switch 13 which is supported on mat 2 in the opening 3 and adapted to be actuated by the positioning of a trash can or the like in said opening.

In FIG. 3, there is shown an electric schematic diagram of the connection of power source 4, wires 12, and switch 13. Power source 4 is shown schematically as a battery for providing direct current. Actually, the power source is a conventional high voltage, low current power pack which will produce sufficient voltage to shock an animal without injuring or killing it. The power source shown in FIG. 3 is, therefore, intended to be a schematic view of such a power pack. One side of power source 4 is connected to switch 13 and the other side of the switch is in turn, connected to a suitable electric lead 14 connected to alternate ones of the wires 12 in the surface of the ridges or ribs 10 of mat 2. The other side of power source 4 is connected by a suitable electric lead 15 to the other wires 12a embedded in ridges or ribs 10 of mat 2.

From the foregoing description, it is seen that mat 2 is provided with a plurality of closely spaced wires 12 and 12a, supported in the upper surface of ridges or ribs 10. The wires 12 and 12a are connected to power source, viz. power pack 4 and are adapted to be energized by closure of switch 13 when a trash can or the like is placed in position in opening 3. The actuation of switch 13 energizes the electric circuit and provides a high voltage, low current electric energization of wires 12 and 12a. The voltage is sufficiently high and the current is sufficiently low that an animal stepping on mat 2 will short or complete the electric circuit between wires 12 and 12a and be shocked by the apparatus. The removal of the animal's paw or foot from the mat will, again, open the circuit. The circuit is energized only when switch 13 is closed by the presence of a trash can or the like. Also, as previously noted, the arrangement of grooves 9 and ridges 10 and also the provision of apertures or passages 11 is effective to drain water away from the upper surface of the mat and prevent the wires 12 and 12a from being shorted out by rainwater. The insulating properties of the material of construction of mat 2 prevent wires 12 and 12a from being shorted out to ground.

ANOTHER EMBODIMENT

Figure 4:
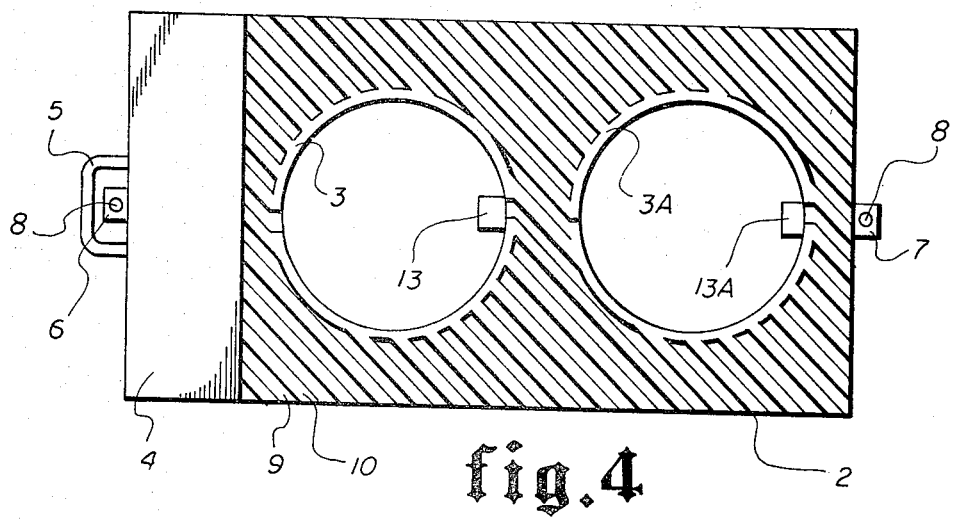
FIG. 4 is a plan view of another embodiment of the invention showing two openings for trash cans.

In FIG. 4, there is shown another embodiment of the animal repellant apparatus shown in FIG. 1 in which there are provided a pair of openings for receiving trash cans or the like which are to be protected from animals. The apparatus shown in FIG. 4 is substantially identical to that shown in FIG. 1-3, except that there are provided a pair of openings 3 and 3a for trash cans and a pair of switches 13 and 13a for actuation of the electric circuit. Switches 13 and 13a are connected in parallel so that the actuation of either switch will energize the electric circuit. Otherwise, the apparatus is constructed and operated in the same manner as that of the equipment shown in FIGS. 1-3 and like parts are given like reference numerals.

ANOTHER EMBODIMENT

Figure 5:
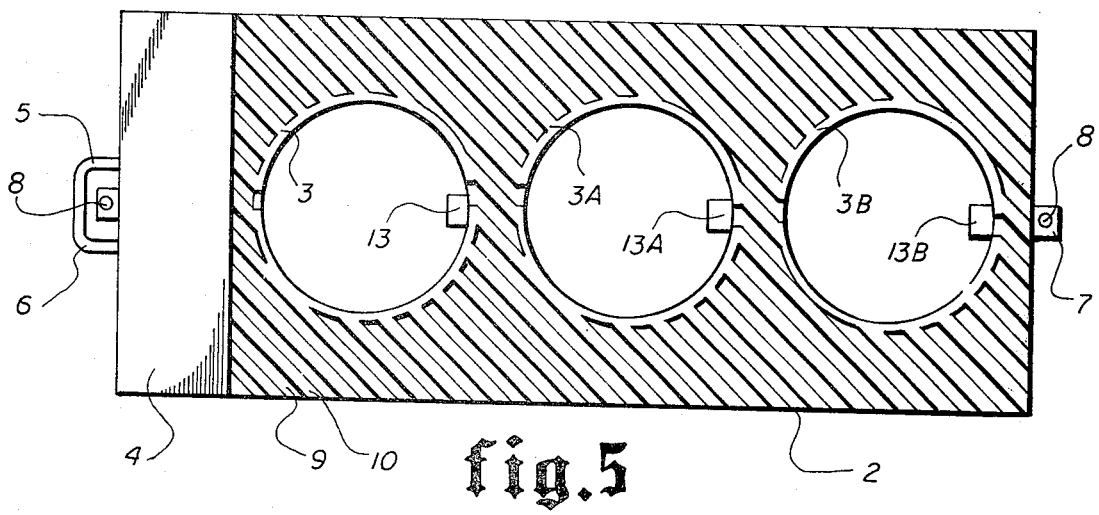
FIG. 5 is a plan view of still another embodiment of the invention showing three openings for receiving trash cans.

In FIG. 5, there is shown another embodiment of the invention which is identical to that shown in FIGS. 1-4 except with a provision of three trash can openings and three switches positioned for actuation by positioning of a trash can in any of the openings. In FIG. 5, the construction is identical to that shown in FIGS. 1-4 and like parts are given like reference numerals, except that there are provided three trash can openings 3, 3a, and 3b and three switches 13, 13a, and 13b. This embodiment of the invention is adapted to receive up to three trash cans and the electric circuit is energized by actuation of any one of the switches 13, 13a, or 13b by positioning a trash can, or the like, in any of the openings 3, 3a or 3b. The switches 13, 13a and 13b are connected in parallel so that actuation of any one said switches will energize the animal repellant electric circuit.

STILL ANOTHER EMBODIMENT

Figure 6:
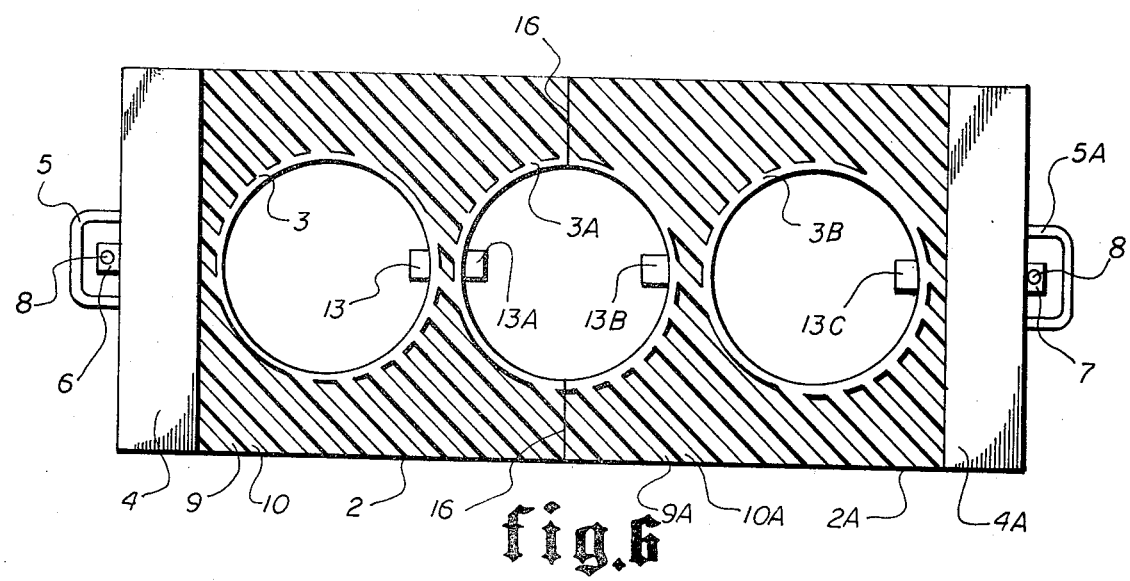
FIG. 6 is a plan view of still another embodiment of the invention showing an animal repellant mat having three openings for receiving trash cans and divided into two separable portions.

In FIG. 6, there is shown still another embodiment of the invention providing for three trash cans and arranging for energization of the electric circuit for repelling animals upon positioning of the trash cans in any of the openings. This apparatus is similar to that shown in FIG. 5, but differs in that mat 2 is formed in two separable parts. This separation of mat 2 into separate parts requires a slight modification in the construction of the animal repellant mat, as will be described below.

In FIG. 6, the mat is formed in two portions 2 and 2a, which separate along the line 16. The mat is provided with center openings 3, 3a, and 3b, as in FIG. 5, except that opening 3a is formed by the joining together of mats 2 and 2a along line 16. Mat portion 2 is provided with power source 4, handle 5, tab 6 and stake hole 8, as in the other embodiments. Likewise, mat 2 has grooves 9 and ridges or ribs 10 as in the other embodiments.

Mat portion 2a is constructed similarly to mat 2, and is provided with power source 4a, handle 5a, tab 7 and stake down hole 8. Mat 2a is provided with grooves 9a and ribs 10a which correspond to the grooves and ribs in the other embodiments. The electric wires 12 and 12a in each of the mat portions 2 and 2a, are energized by connection to the respective power sources 4 and 4a.

As noted above, the apparatus is provided with four switches 13, 13a, 13b and 13c. Switch 13 is actuated by positioning of a trash can in opening 3 and energizes only the wires located on the ridges or ribs 10 of mat portion 2. Switch 13c is actuated by the positioning of a trash can on opening 3b and energizes only the wires 12 and 12a powered by power source 4a. Switches 13a and 13b are actuated by positioning a trash can in opening 3a and function to energize the wires 12 and 12a connected to both of the power sources 4 and 4a.

The embodiment shown in FIG. 6, is one which is somewhat easier to handle than the embodiment of FIG. 5 although it does require an extra power source. The construction of the several alternate embodiments shown in FIGS. 4, 5 and 6 is identical to that shown in FIGS. 1-3, with respect to the arrangement of groove 9, ridges or ribs 10 and drainage apertures or passages 11. The arrangement of wires 12 and 12a is the same as shown in FIGS. 1-3. The wires 12 and 12a are partially embedded in the upper surface of ribs or ridges 10 (or 10a) and are exposed or uninsulated on their upper surfaces so that, when energized, an animal touching said wires will be shocked and repelled. The arrangement of grooves and drainage holes provide for adequate drainage of rainwater to prevent the wires 12 and 12a from being shorted out. In all of the embodiments of the invention the power source 4 (and 4a) produces sufficient voltage to shock an animal and repel it but has sufficiently low current to avoid injuring or killing the animal or injuring a human, adult or child.

While this invention has been described fully and completely with special emphasis on several preferred embodiments, it should be understood that within the scope of the appended claims, the invention may be practiced otherwise than as specifically described herein.

I claim:

1. An animal repellant apparatus comprising
a flat mat of an insulating elastomeric material having at least one opening of a size and shape to receive a trash can,
an electric power source secured on said mat,
said mat having spaced ridges and grooves in the surface thereof,
a plurality of wires extending along the surface of at least some of said grooves, with at least part of said wires embedded partly in said surface and having their upper surfaces exposed and uninsulated,
means connecting alternate ones of said wires to one side of said power source, and
means connecting the remaining wires to the other side of said power source,
whereby an animal stepping on any two adjacent wires will be shocked and repelled, and whereby said grooves provide for drainage of water from said mat to prevent short circuiting said wires.

2. An animal repellant apparatus according to claim 1 in which
said mat includes an electric switch secured in said opening and connected in circuit with said power source,
said switch being adapted to be actuated by the positioning of a trash can in said opening to energize the circuit from said power source to said wires.

3. An animal repellant apparatus according to claim 1 or claim 2 in which
said mat has a plurality of apertures extending from the bottoms of at least some of said grooves to further assist in the drainage of water from said mat.

4. An animal repellant apparatus according to claim 1 or claim 2 in which
said grooves and ridges in said mat are closely spaced in parallel relation.

5. An animal repellant apparatus according to claim 1 or claim 2 in which
said electric power source comprises a portable power pack providing sufficient voltage at low current to shock and repel an animal but not injure a human adult or child.

6. An animal repellant apparatus according to claim 1 including
a handle secured on said mat for carrying and hanging the same, and means on said mat for staking the same to the ground.

7. An animal repellant apparatus according to claim 1 in which
said mat has a plurality of openings therein, each adapted to receive a trash can therein.

8. An animal repellant apparatus according to claim 7 in which
said mat includes a plurality of electric switches secured one in each of said openings and connected in circuit with said power source,
said switches each being adapted to be actuated by the positioning of a trash can in one of the respective openings to energize the circuit from said power source to said wires.

9. An animal repellant apparatus according to claim 7 in which
said mat comprises at least two separable portions, and
each of said mat portions includes a separate power source secured thereon and connected to energize the wires secured in the surface of the ridges therein.

10. An animal repellant apparatus according to claim 9 in which
said mat has at least one of said openings extending across the line of separation of said separable portions.

* * * * *